United States Patent [19]

Smith

[11] Patent Number: 4,989,410

[45] Date of Patent: Feb. 5, 1991

[54] COMPOUND POWER PLANT

[76] Inventor: Roger R. Smith, 7261 Lyons Rd., Imlay City, Mich. 48444

[21] Appl. No.: 331,724

[22] Filed: Apr. 3, 1989

[51] Int. Cl.⁵ .............................................. F02G 5/00
[52] U.S. Cl. ......................................... 60/607; 60/624
[58] Field of Search .................................. 60/607, 624

[56] References Cited

U.S. PATENT DOCUMENTS 2,625,006  1/1953  Lundquist ............................ 60/624
3,007,302  11/1961  Vincent ................................ 60/624
4,452,043  6/1984  Wallace ................................ 60/624

FOREIGN PATENT DOCUMENTS

2117672  10/1971  Fed. Rep. of Germany ......... 60/624

Primary Examiner—Douglas Hart
Attorney, Agent, or Firm—Peter A. Taucher; David L. Kuhn

[57] ABSTRACT

The invention is a compound motor having an internal combustion engine, a turbine driven by exhaust from the engine and compressor connected to the turbine. The compound motor has a clutch means to declutch the compressor from the turbine and to disable the turbine from transferring power to a gear set. The gear set is capable of simultaneously receiving power from the engine and the turbine and transferring this power to a final output shaft. The clutch mechanism brake or debrakes, and clutches or declutches, in response to torque or rotational force exerted on the turbine by the exhaust gas from the engine.

9 Claims, 6 Drawing Sheets

COMPOUND POWER PLANT

GOVERNMENT INTEREST

The invention described herein may be manufactured, used, and licensed by or for the Government for governmental purposes without payment to me of any royalty thereon.

BACKGROUND AND SUMMARY

The invention relates to hybrid or compound motors wherein two engines of differing types are coupled together to drive a common output shaft.

The invention is a compound motor or power plant having a turbine engine or turbo unit, and having a rotary engine coupled with the turbo unit. The turbo unit, powered by exhaust from the rotary engine, can both turbocharge the rotary engine and drive a common output shaft. The common output shaft is also driven by the rotary engine. At lower motor speeds, the rotary engine will be more efficient than the turbo unit, and will supply all or most of the motor power, whereas at higher speeds the turbo unit will be more efficient and will supply most of the power. The compound motor has a planetary gear set connecting both the turbo unit and the rotary engine to the common output shaft. This gear set can simultaneously and independently receive drive inputs from the turbo unit and the rotary engine, so that turbo unit speed and rotary engine speed need not be matched. The turbo unit also includes a clutch assembly which selectively brakes the turbine of the turbo unit or disconnects a turbocharge compressor from the turbine. The clutch assembly operates in response to the torque exerted on the turbine by exhaust gases from the rotary engine.

DETAILED DESCRIPTION OF THE INVENTION

Figure 1:
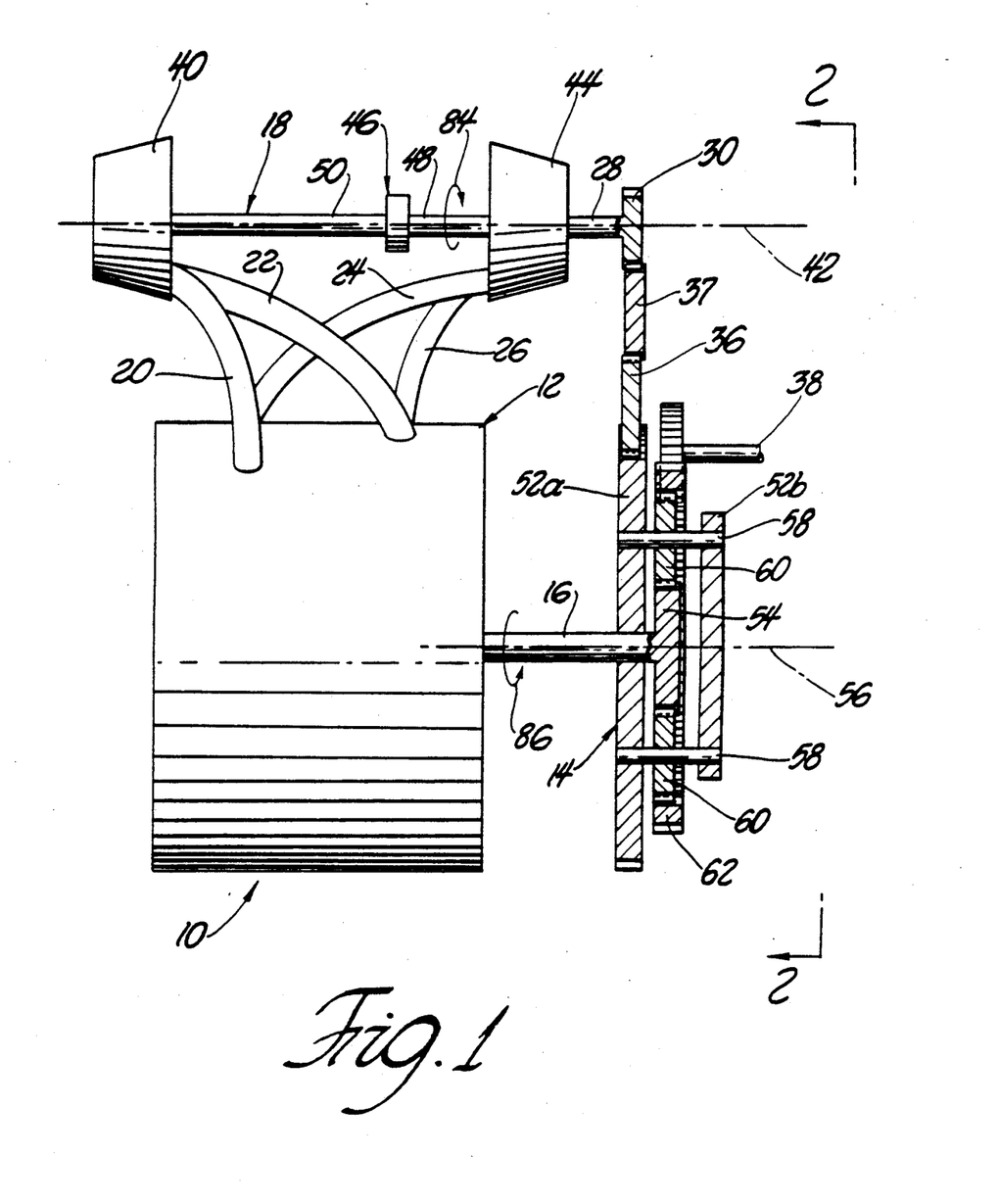
FIG. 1 is a an elevational view of my compound engine, the turbo unit being shown semi-schematically.
Figure 2:
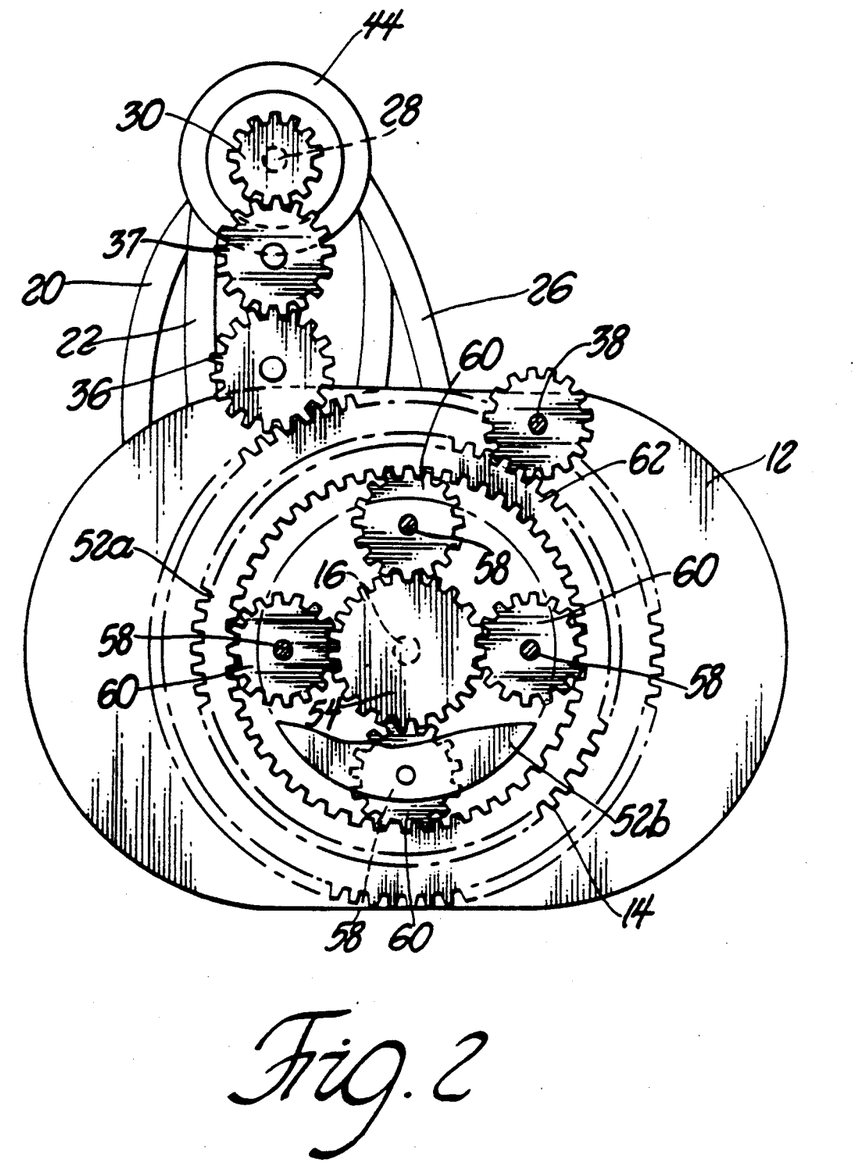
FIG. 2 is a view along line 2—2 in FIG. 1.

FIGS. 1 and 2 show a compound engine 10, major components of which are a rotary engine 12, and a planetary gear set 14 connected to engine 12 by output shaft 16. Another major component of compound engine 10 is a turbo unit 18 connected to the intake and exhaust ports of rotary engine 12 by ducts 20, 22, 24, and 26. Turbo unit 18 is connected to planetary gear set 14 by means of a gear train comprised of turbine output shaft 28, gear 36, and gear 37. It is contemplated that rotary engine 12 and turbo unit 18 will, at times, both contribute power to a final output shaft 38 which is driven by one of the gears of planetary gear set 14.

Turbo unit 18 includes an air compressor 40 having fan-like blades (not shown) rotatable about axis 42. Air exits compressor 40 through ducts 20 and 22 and travels to the intake ports (not shown) of engine 12. Turbo unit 18 has a turbine 44 driven when exhaust from engine 12 impacts impeller blades (not shown) rotatable on axis 42. Between compressor 40 and turbine 44 is a clutch 46 to make or break connection between shaft segments 58 and 48, which connect to compressor 40 and turbine 44, respectively. On the axially opposite side of turbine 44 from shaft segment 48 is turbine output shaft 28.

Driveably connected to both turbo unit 18 and engine 12 is planetary gear set 14. As noted, the drive connection from turbo unit 18 to gear set 14 is a gear train having turbine output gear 30 and transition gears 36 and 37. Gear 36 meshes with teeth on the outer diameter of carrier disk 52a of gear set 14.

The drive connection between gear set 14 and the engine is output shaft 16 of engine 12, which drives sun gear 54 of gear set 14. Meshed to both the inner diametrical teeth of ring gear 62 and the teeth of sun gear 54 are a plurality of planet gears 60. These planet gears are rotatably mounted to a planet gear carrier comprised of planet carrier disks 52a 52b, and a set of carrier shafts 58 connected between the disks. Planet gears 60 rotate relative to their own axes on carrier shafts 58 and also revolve around sun gear 54 about axis 56.

Figure 3:
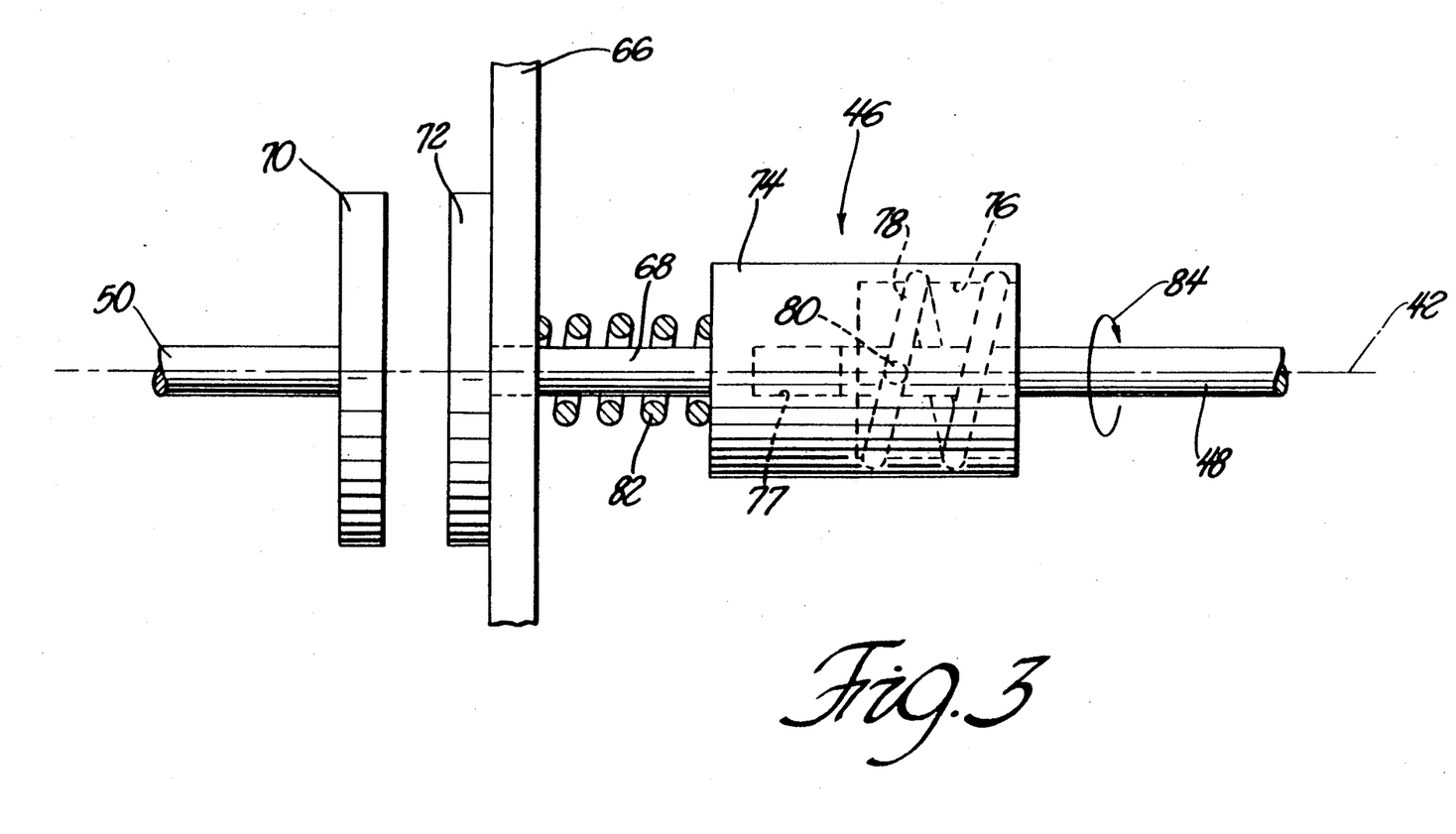
FIG. 3 shows details of the clutch for the turbo unit shown in FIG. 1.

FIG. 3 shows the assembly of clutch 46, which includes a planar anchor member 66 fixed to a frame (not shown) to which engine 12 and turbo unit 18 are mounted. The frame can be part of a vehicle powered by compound motor 10. Anchor member 66 has a frictional engagement surface faced toward translatable clutch plate 72. Clutch plate 72 itself has two frictional engagement surfaces, one faced toward anchor member 66 and the other faced toward axially fixed clutch plate 70. Clutch plate 70 has a frictional engagement surface faced toward clutch plate 72. Clutch plate 70 rotates shaft segment 50 and thereby also rotates compressor 40 (FIG. 1).

Clutch plate 72 is attached to a connection rod 68 extending through anchor member 66 and fixed to axially translatable housing 74. Translation of housing 74 moves clutch plate 72 into one of three possible positions: a first position where it is frictionally engaged to anchor member 66, a second position where it engages neither anchor member 66 nor clutch plate 70, and a third position where it engages only clutch plate 70. A compression spring 82 is coiled around shaft 68 and biases housing 74 away from anchor member 66 and thereby biases clutch plate 72 into engagement with anchor member 66.

Housing 74 is a generally cylindrically shaped member concentric with axis 42. Housing 74 defines a stepped bore having a larger diameter section 76 and defines a smaller diameter section 77 for closely and slidingly receiving one end of shaft segment 48. Larger diameter section 76 has a peripheral wall which defines a helical groove 78 winding about the end of axially fixed shaft segment 48. Shaft segment 48 includes a protrusion 80 extending radially into groove 78 for camming, sliding engagement along the groove so that rotation of shaft segment 48 will translate housing 74. Rotation of shaft segment 48 in the direction of arrow 84 will translate housing 74 to the left in FIG. 3.

In operation, engine 12 turns shaft 16 in the direction of by arrow 86 in FIG. 1 and ultimately creates a torque on shaft segment 48 in the direction of arrow 84 in FIG. 3. This torque tends to translate housing 74 leftward in FIG. 3, so that this torque works against spring 82, which holds clutch plate 72 against anchor member 66. Due to gear reduction in the gear train between shaft 16 and shaft segment 48, torque transferred to shaft segment 48 from shaft 16 is very small compared to the torque on shaft 16 itself. This transferred torque is alone insufficient to compress spring 82 or move housing 74 toward anchor member 66. As engine 12 gets fuel at a faster rate, and as engine and exhaust temperatures rise, exhaust flows from engine 12 through turbine 44 with increasing force and speed. The exhaust creates a correspondingly increasing torque component on shaft segment 48 in the direction of arrow 84. The torque from turbine 44 sums with the torque on shaft segment 48 transferred from shaft 16. At a given, predetermined speed of engine 12, there will be enough summed torque in the direction of arrow 84 to turn shaft segment 48. This summed torque will slide protrusion 80 along helical groove 78 and translate housing 74 toward anchor member 66 against the bias of spring 82. Clutch plate 72 will disengage from anchor member 66, whereby turbine 44 is debraked.

It is contemplated that the torque from turbine 44 will be greater than the torque transferred from shaft 16 when clutch plate 72 disengages from anchor member 66. Such a result can be accomplished by controlling the overall gear ratio of the gear train between shaft 16 and shaft segment 48 or by selecting an appropriate stiffness for spring 82. Since the torque from turbine 44 is greater than the torque transferred from shaft 16, turbine 44 will drive the planetary gear set and not vice versa, whereby carrier disks 52a and 52b rotate in the direction of arrow 86 (FIG. 1). the carrier disks thus add to the power transferred to final output shaft 38 by shaft 16 through sun gear 54.

It is also contemplated that the summed torque on shaft segment 48 in the direction arrow 84 will be within one of three ranges of value. In the first or lowest range, the summed torque will be insufficient to disengage clutch plate 72 from anchor member 66. In the second or intermediate range, the summed torque will be sufficient to disengage clutch plate 72 from anchor member 66, but will be insufficient to compress spring 82 so far as to force clutch plate 72 against clutch plate 70. In the third or highest torque range, the summed torque will be sufficient to translate clutch plate 72 into frictional engagement with clutch plate 70, whereby shaft segment 50 is rotated to operate compressor 40. Engine 12 will then be turbocharged.

Compound engine 10 has a first, second and third operating mode corresponding to the respective first, second and third ranges of the summed torque. In the first mode, engine 12 receives neither a power assist nor turbocharging from turbo unit 18. In the second mode, engine 12 receives a power assist from turbo unit 18, but receives no turbocharging. In the third mode, engine 12 receives both a power assist and turbocharging from turbo unit 18. It is of course possible to make the second or intermediate range of the summed torque extremely narrow, so that engine 12 will transition essentially directly from the first mode where it receives nothing from turbo unit 18 to the third mode where the engine receives both power assistance and turbocharging.

Figure 4:
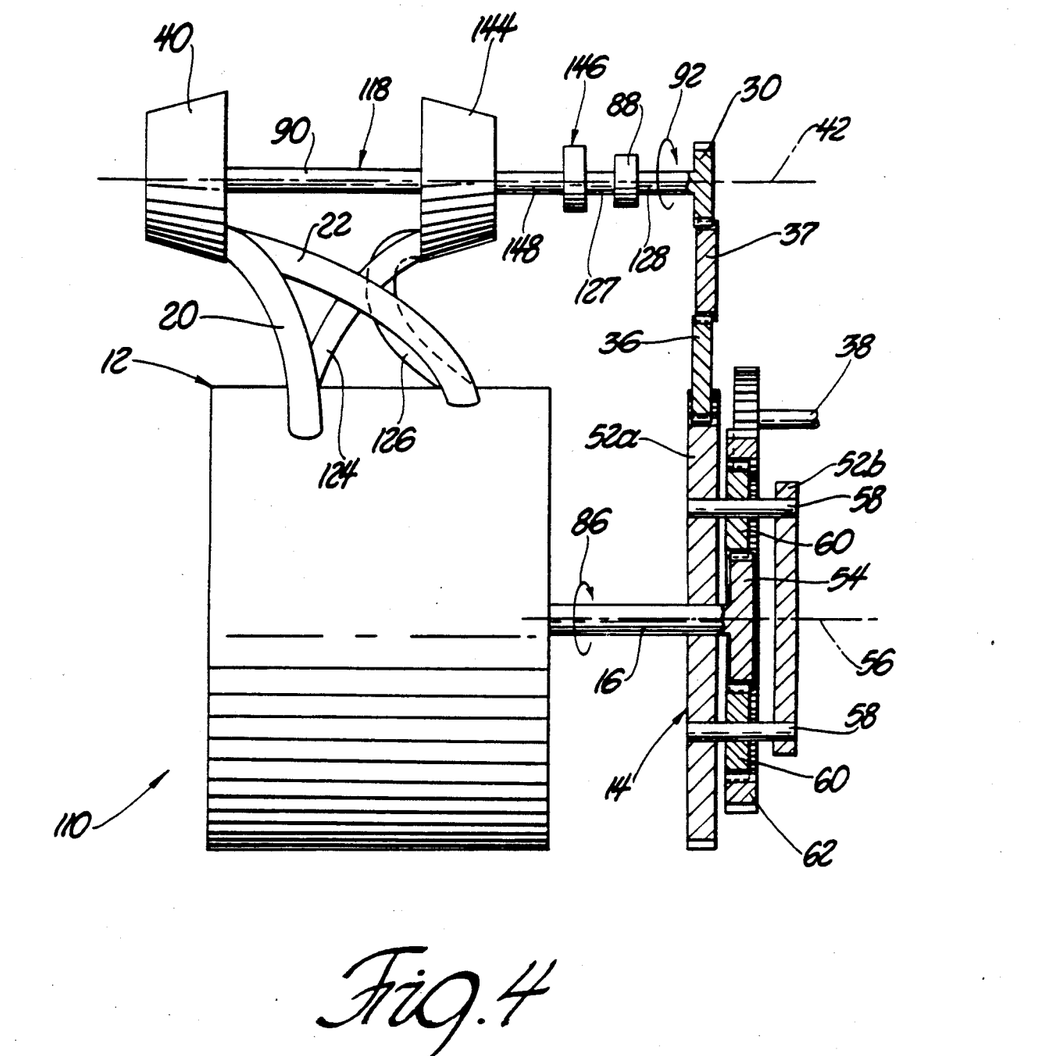
FIG. 4 shows an alternate embodiment of my compound engine.

FIG. 4 shows compound engine 110, which is an alternate embodiment of compound engine 10. Compound engine 110 is essentially the same as compound engine 10 except that compound engine 110 has a turbo unit 118 which differs from turbo unit 18. Compound engine 110 also has ducts 124 and 126 which are shaped slightly differently than corresponding ducts 24 and 26 of compound engine 10. For convenience, identical elements in compound engines 10 and 110 are given the same element numbers.

Turbo unit 118 has a turbine 144 driving compressor 40 by means of intermediate shaft 90. Fixed to the axially opposite side turbine 144 from intermediate shaft 90 is shaft segment 148, which connects to clutch assembly 146. Shaft segment 127 connects clutch assembly 146 to one-way clutch 88 and shaft segment 128 connects one-way clutch 88 to turbine output gear 30. One-way clutch 88 permits rotational force in the direction of arrow 92 to be transferred from turbo unit 118 to turbine output gear 30, and prevents rotational force in the direction of arrow 92 from being transferred from gear 30 to turbo unit 118. The purpose of one-way clutch 88 is to prevent power at shaft 16 from being used to turbocharge engine 12. This clutch accomplishes its purpose by interrupting the series of mechanical connections between shaft 16 and compressor 40. It is noted that one-way clutch 88 may also be used in compound engine 10 by, for example, placing the one-way clutch on shaft 28 (FIG. 1) so that the connection between gear 30 and turbine 44 is interruptable. The structure of one-way clutch 88 is subsequently discussed further with respect to FIG. 6.

Figure 5:
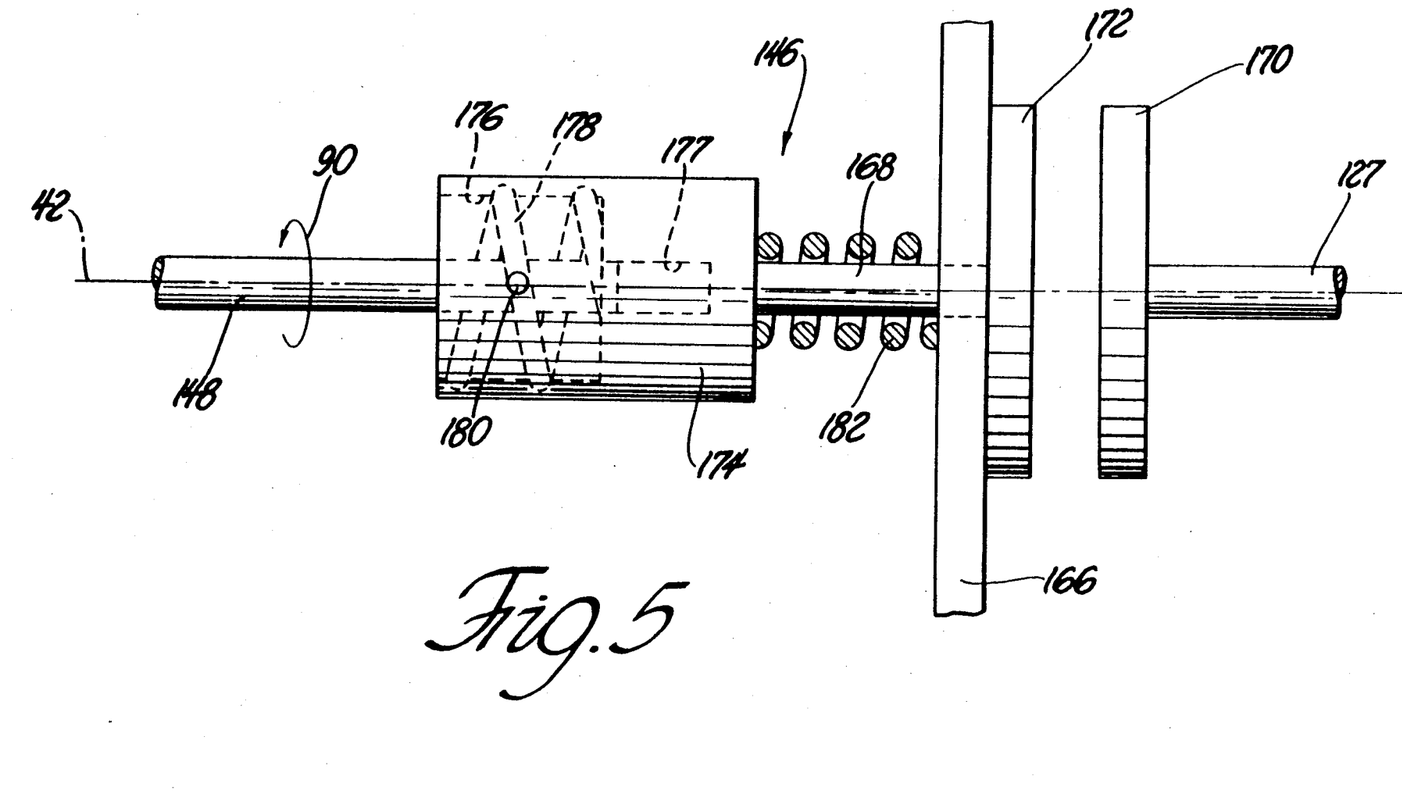
FIG. 5 shows details of the clutch for the alternate embodiment of my invention shown in FIG. 4.

Detailed in FIG. 5 is clutch assembly 146, which includes a planar anchor member 166 fixed to a frame (not shown) to which engine 12 and turbo unit 118 are mounted. anchor member 166 has a frictional engagement surface faced toward translatable clutch plate 172. Clutch plate 172 itself has two frictional engagement surfaces, one faced toward anchor member 166 and the other faced toward an axially fixed clutch plate 178. Clutch plate 178 has a frictional engagement surface which is faced toward clutch plate 172. Clutch plate 178 rotates shaft segment 127 and thereby also rotates gear 30 when one-way clutch 88 is connectively engaged.

Clutch plate 172 is attached to a connection rod 168 extending through anchor member 166 and fixed to axially translatable housing 174. Translation of housing 174 moves clutch plate 172 to one of three positions: a first position where it is frictionally engaged to anchor member 166, a second position where it engages neither anchor member 166 nor clutch plate 178, and a third position where it engages only clutch plate 170. A compression spring 182 is coiled around shaft 168 and biases housing 174 away from anchor member 166 and thereby biases clutch plate 172 into engagement with anchor member 166.

Housing 174 is a generally cylindrically shaped member concentric with axis 42. Housing 174 defines a stepped bore having a larger diameter section 176 and a smaller diameter section 177 for closely and slidingly receiving one end of shaft segment 148. Larger diameter section 177 has a peripheral wall which defines a helical groove 178 winding about the end of axially fixed shaft segment 148. Shaft segment 148 includes a protrusion 180 extending radially into groove 178 for camming, sliding engagement along the groove so that rotation of shaft segment 148 will axially translate housing 174. Rotation of shaft segment 48 in the direction of arrow 90 will translate housing 74 to the right in FIG. 5.

When engine 12 is running, exhaust gases pass through ducts 124 and 126 and exert a rotational force on turbine 144 in the same rotational direction as arrow 92 in FIG. 4 or as arrow 90 in FIG. 5. As engine 12 burns fuel faster, and as engine and exhaust temperatures rise, exhaust gases exert increasing rotational force on turbine 144. Eventually, there is sufficient rotational force on turbine 144 so that the turbine rotates shaft 148, shaft protrusion 180 cammingly tracks along groove 178, housing 174 translates toward anchor member 166 against the bias of spring 182, and clutch plate 172 disengages from anchor member 166. The assembly of turbine 144 and compressor is thus debraked, so that compressor 40 accelerates the flow of air into engine 12, whereby engine 12 is turbocharged. As engine 12 burns fuel even faster, and as engine and exhaust temperatures continue to rise, the increased rotational force on turbine 144 ultimately causes clutch plate 172 to translate into frictional engagement with clutch plate 170.

In another manner of speaking, the torque on shaft segment 148 in the direction of arrow 90 will be within one of three ranges of value. In the first or lowest range, the torque will be insufficient to disengage clutch plate 172 from anchor member 166. In the second or intermediate range, the torque will be sufficient to disengage clutch plate 172 from anchor member 166, but will be insufficient to compress spring 182 so far as to force clutch plate 172 against clutch plate 170. In the third or highest torque range, the torque will be sufficient to translate clutch plate 172 into frictional engagement with clutch plate 170, whereby shaft segment 127 is rotated to drive turbine output gear 30.

Compound engine 110 has a first, second and third operating mode corresponding to the respective first, second and third ranges of the rotational force on turbine 144. In the first mode, engine 12 receives neither a power assist nor turbocharging from turbo unit 118. In the second mode, engine 12 receives turbocharging from turbo unit 118, but receives no power assist therefrom. In the third mode, engine 12 receives both turbocharging and a power assist from turbo unit 118. It is possible to make the second range of force extremely narrow, so that engine 12 will transition essentially directly from the first mode where it receives nothing from turbo unit 118 to the third mode where it receives both power assistance and turbocharging.

Figure 6:
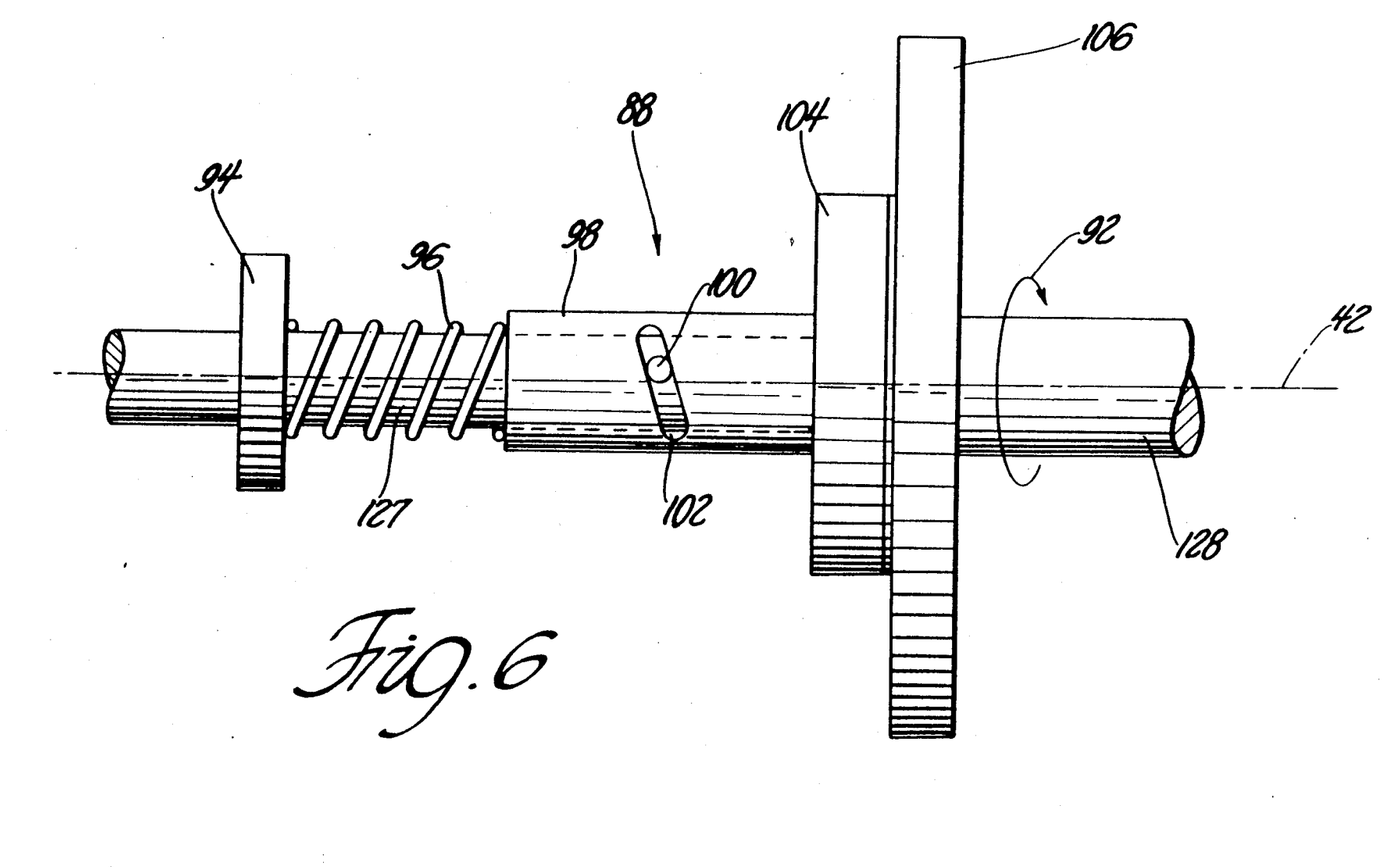
FIG. 6 shows details of a one-way clutch usable with either embodiment of my invention.

FIG. 6 is shows an example of a one-way clutch 88 which can be used in either embodiment of my invention and which is shown on the FIG. 4 embodiment. Clutch 88 has an axially fixed clutch plate 106 attached to shaft 128 and an axially translatable clutch plate 104 at the end of shaft segment 127. Slideable on shaft segment 127 and attached to clutch plate 104 is sleeve 98 defining an angled slot whose one end is more distal from clutch plate 104 than the other end. Slidable along the slot is a protrusion 100 extending radially outward from shaft 127, so that rotation of shaft 127 in the direction of arrow 92 thrusts clutch plate 104 into engagement with clutch plate 106. Clutch 88 includes a spring 96 for biasing sleeve 98 and clutch plate 104 toward clutch plate 106 and includes a collar 94 on shaft segment 127 for retention of spring 96. If clutch plate 106 begins to rotate clutch plate 104 in the direction of arrow 92, then clutch plate 104 is translated away from clutch plate 106 by the interaction of slot 102 and protrusion 100. clutch plate 106 then slips with respect to clutch plate 104, which stops rotating.

I wish it to be understood that I do not desire to be limited to the exact details of construction shown and described since obvious modifications will occur to those skilled in the relevant art without departing from the spirit and scope of the appended claims.

What is claimed is:

1. A compound motor for a vehicle, comprising:
   an engine defining therein a chamber for the combustion of fuel, an intake passage leading to the combustion chamber and an exhaust passage leading from the combustion chamber;
   a drive shaft extending from the engine;
   means in the engine for rotating the drive shaft in response to the combustion of fuel in the chamber;
   a rotary compressor at the entry end of the intake passage;
   a turbine at the exit end of the exhaust passage, the turbine being drivable by exhaust gases from the combustion chamber;
   means for selectively transferring rotational motion of the turbine to the compressor, the transferring means including a clutch for mechanically connecting or disconnecting the compressor from the turbine;
   a planetary gear set having a sun gear member, a ring gear member surrounding the sun gear member, a planet gear member rotatable about its own axis and meshed between the sun gear member and the ring gear member, and a planet carrier member upon which the planet gear member is mounted for revolution about the sun gear member;
   a gear train between one of the members of the planetary gear set and the turbine;
   another one of the members of the planetary gear set being driven by the drive shaft extending from the engine; and
   a final output shaft driven by a third member of the planetary gear set.

2. The motor of claim 1 wherein the clutch includes:
   a planar anchor member fixed relative to the engine;
   a first clutch plate faced toward the anchor member;
   a second clutch plate having two frictional engagement surfaces, one of the frictional engagement surfaces faced toward the anchor member, and the other frictional engagement surface faced toward the first clutch plate; and
   means for controlling movement of the second clutch member between the anchor member and the first clutch plate in response to rotational force exerted on the turbine.

3. The motor of claim 2 wherein the controlling means includes:
   a housing fixed to the second clutch plate;
   an actuator shaft extending from the turbine into the housing; and
   a protrusion extending from the actuator shaft into engagement with the housing such that rotation of the actuator shaft translates the housing and the second clutch plate relative to the anchor member.

4. The motor of claim 3 wherein the controlling means further includes a means for biasing the housing away from the anchor member.

5. The motor of claim 4 wherein the housing defines a stepped bore having a larger diameter section and a smaller diameter section, wherein the smaller diameter section closely receives one end of the actuator shaft, and the larger diameter section has an inner peripheral wall defining a helical groove in which the protrusion cammingly tracks.

6. The motor of claim 5 further including a one-way clutch means for permitting rotational force to be transmitted from the turbine to the planetary gear set while preventing the transfer of rotational force from the planetary gear set to the turbine.

7. The motor of claim 6 wherein the second clutch plate has a first position associated with a relatively lower range of rotational forces on the turbine, a second position associated with an intermediate range of rotational forces on the turbine greater than the lower range, and a third position associated with a relatively higher range of rotational forces on the turbine greater than the intermediate range; the second clutch plate being frictionally engaged to the anchor member during the first position, the second clutch plate being free of the anchor member and the first clutch plate during the second position, the second clutch plate being frictionally engaged to the first clutch plate during the third position.

8. A compound motor, comprising:
   an engine having a chamber to combust fuel, an intake passage leading to the chamber and an exhaust passage leading from the chamber;
   a drive shaft for the engine;
   means for rotating the drive shaft in response to combustion of fuel in the chamber;
   a turbine at the exhaust passage rotatable by gases exiting the chamber;
   a compressor at the intake passage disengagably connected to the turbine;
   a gear set for rotating a final output shaft, the gear set receiving drive inputs from the engine drive shaft and from the turbine so that the gear set can be driven by the turbine, the drive shaft, or simultaneously by the turbine and the drive shaft;
   a clutch means for selectively braking the turbine and selectively clutching or declutching the compressor from the turbine.

9. The compound motor of claim 8 wherein the clutch brakes the turbine or clutches the compressor to the turbine in response to rotational force exerted on the turbine by exhaust from the engine.

* * * * *